United States Patent [19]
Madwed

[11] Patent Number: 5,547,038
[45] Date of Patent: Aug. 20, 1996

[54] WHEELED CHASSIS HAVING INDEPENDENTLY PIVOTABLE DRIVEWHEELS FOR OMNIDIRECTIONAL MOTION

[76] Inventor: Albert Madwed, 110 Wedgewood Dr., Easton, Conn. 06612

[21] Appl. No.: 116,227

[22] Filed: Sep. 2, 1993

Related U.S. Application Data

[63] Continuation of Ser. No. 739,329, Aug. 1, 1991, abandoned.
[51] Int. Cl.⁶ ........................................................ B60K 1/02
[52] U.S. Cl. ......................... 180/253; 180/65.5; 180/907; 280/98
[58] Field of Search ........................... 280/91.99, 98, 280/47.11; 180/24.07, 212, 213, 252, 253, 308, 65.1, 65.5, 211, 23, 24, 24.01, 24.03, 907; 364/424.01, 424.05

[56] References Cited

U.S. PATENT DOCUMENTS

| | | | |
|---|---|---|---|
| 3,067,839 | 12/1962 | Gibson | 180/253 |
| 3,572,458 | 3/1971 | Tax | 280/91 |
| 3,912,037 | 10/1975 | Krieg | 280/91 |
| 3,972,379 | 8/1976 | Norris | 180/253 |
| 4,044,853 | 8/1977 | Melke | 180/19.2 |
| 4,444,287 | 4/1984 | Voelz | 180/252 |
| 4,483,405 | 11/1984 | Noda et al. | 180/907 |
| 4,599,030 | 7/1986 | Skaalen et al. | 180/24 |
| 5,058,016 | 10/1991 | Davidovitch | 364/424.01 |
| 5,065,320 | 11/1991 | Hayashi | 364/424.01 |
| 5,259,721 | 11/1993 | Sato et al. | 180/211 |

FOREIGN PATENT DOCUMENTS

| | | | |
|---|---|---|---|
| 2244684 | 12/1991 | United Kingdom | 180/907 |

Primary Examiner—Anne Marie Boehler
Attorney, Agent, or Firm—Cohen, Pontani, Lieberman, Pavane

[57] ABSTRACT

A wheeled chassis having separately and independently pivotable drivewheels for omnidirectional motion, including a frame preferably defining at least three corners; first and second drivewheels, each of which is connected by a kingpin to the frame and preferably to a respective one of two of the corners of the frame; at least one free-spinning wheel rotatably attached to a third corner of the frame; first and second pivoting devices for separate and independent and substantially unrestricted 360° pivoting of each respective drivewheel about a substantially vertical axis, the first and second pivoting devices cooperatively determining a direction of travel of the chassis; first and second drive devices each operatively connected to a respective one of the drivewheels for moving the chassis in the determined direction of travel; and a control system operatively connected to the pivoting devices and to the drive devices for controlling and changing the direction of travel and setting a speed of travel of the chassis on and along a ground surface.

32 Claims, 12 Drawing Sheets

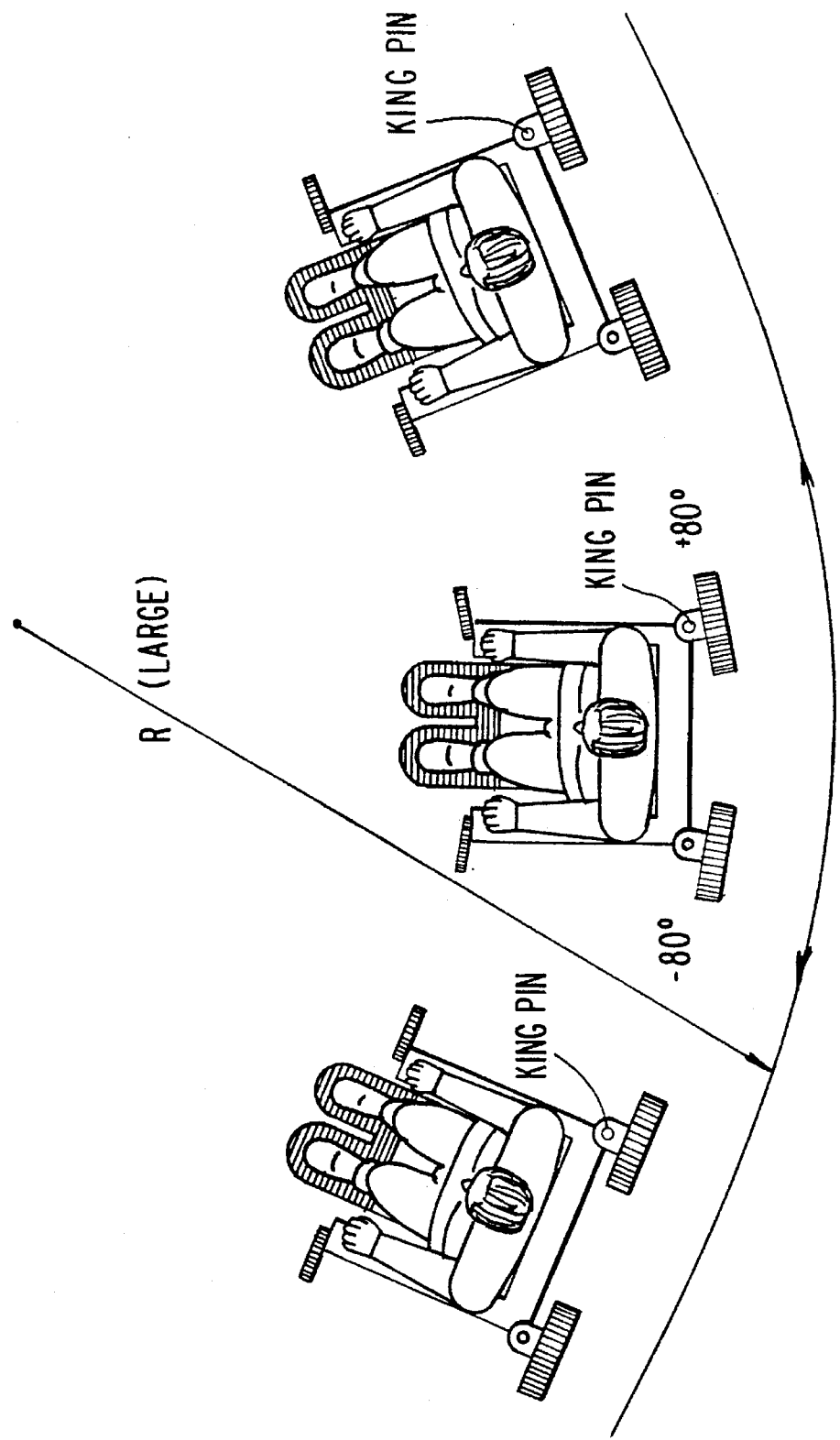

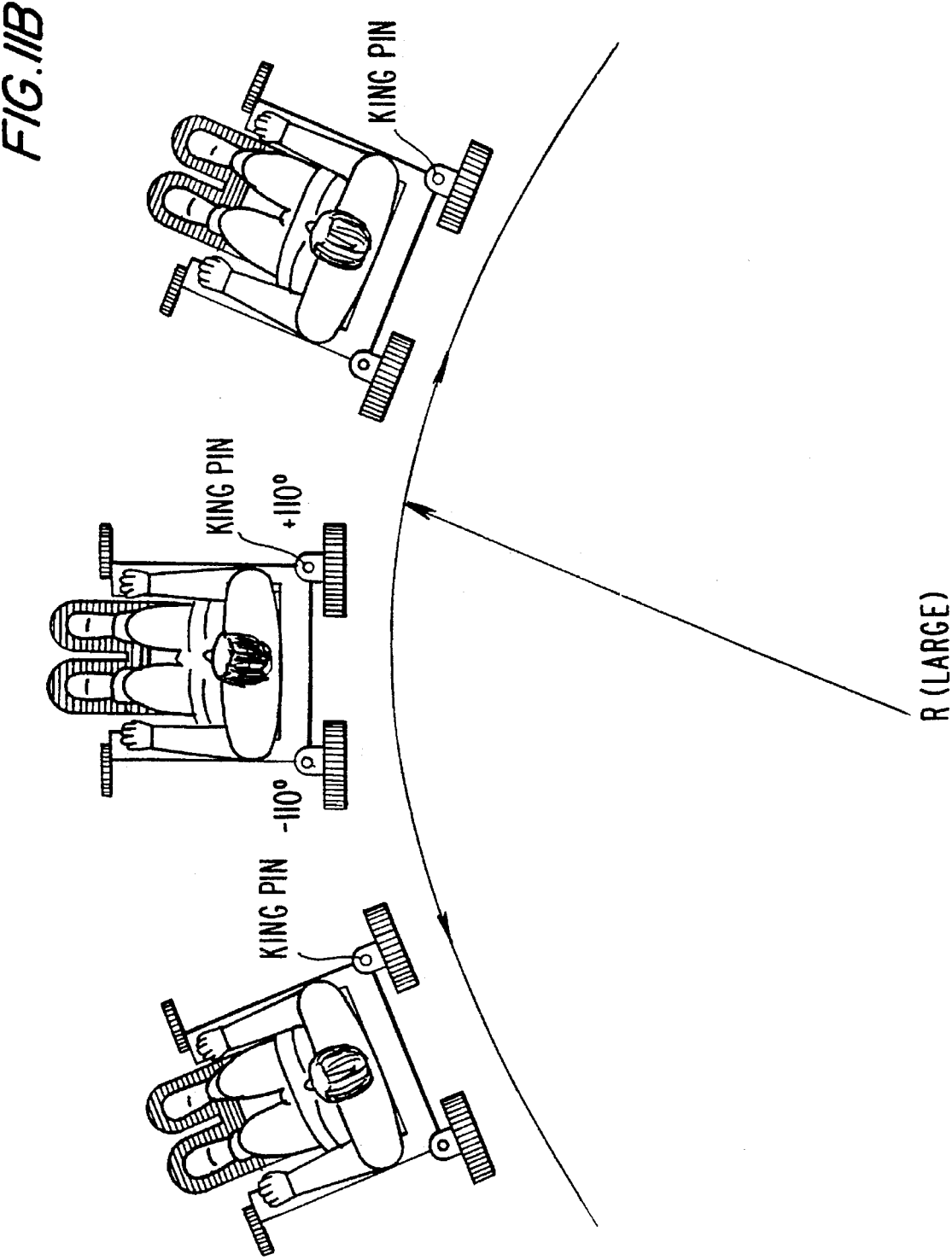

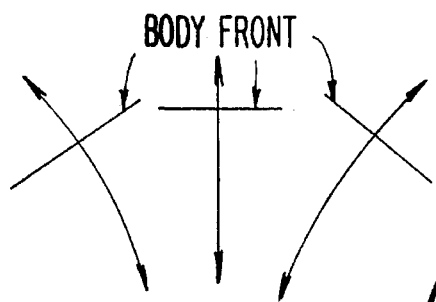
FIG.12A
PRIOR ART
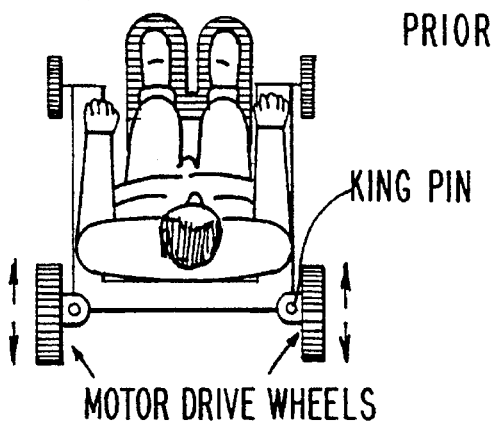
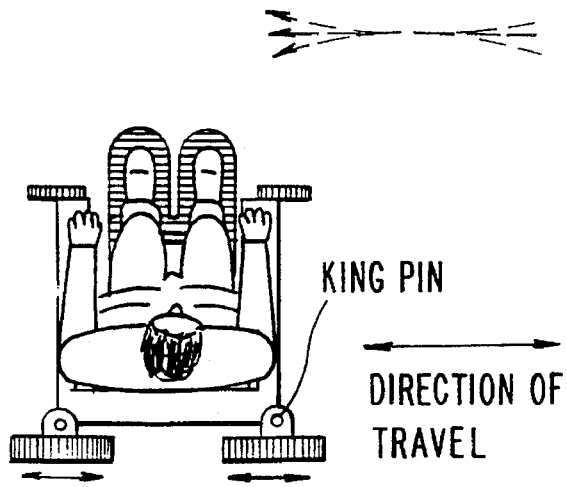
FIG.12B
PRIOR ART
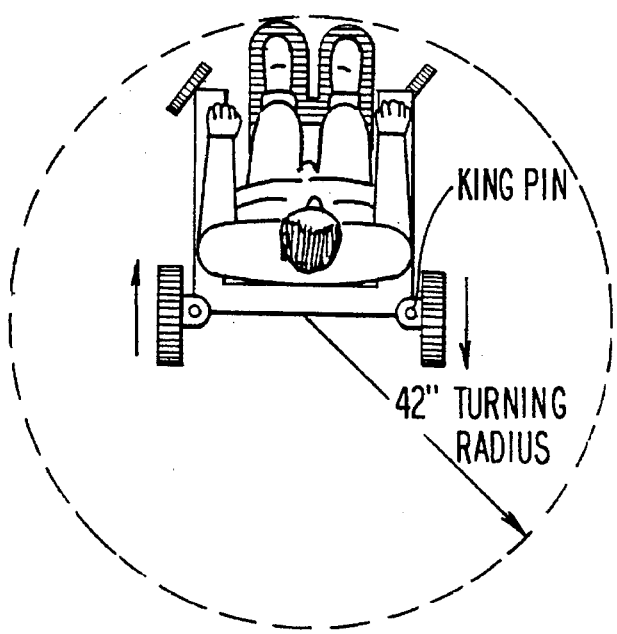
FIG.12C
PRIOR ART

WHEELED CHASSIS HAVING INDEPENDENTLY PIVOTABLE DRIVEWHEELS FOR OMNIDIRECTIONAL MOTION

FIELD OF THE INVENTION

This is a continuation, of U.S. application Ser. No. 07/739,329, filed Aug. 1, 1991.

The present invention relates to a motorized wheeled chassis, particularly to an electrically powered wheelchair having a pair of independently pivotable drivewheels mounted at two corners of a generally rectangular chassis and a pair of pivotally-freewheeling wheels mounted at the remaining two corners of the chassis opposite the drivewheels, and equipped with separately controllable pivoting and drive means for the independent and unrestricted pivoting and driving of each of the drivewheels to enable true omnidirectional travel.

BACKGROUND OF THE INVENTION

A conventional motorized wheelchair is typically equipped with a chassis having front wheels that consist of a pair of free-spinning castors and rear wheels that consist of a pair of motor-operated wheels which are fixed to the chassis and are frequently driven independently of one another by reversible, variable-speed DC motors. In such wheelchairs, the rotative direction and speed of each of the fight and left motor-operated wheels are varied by reversing the power source connection of the appropriate DC drive motor and by regulating the input voltages to the motor, which actions result respectively in switching of the direction of movement of the wheelchair (between forward and backward travel) and changing of the speed (rpm) of movement of the wheelchair on or along an underlying ground surface. In this manner, a conventional motorized wheelchair is fairly easily advanced, retreated, turned to the right or to the left, and turned around in a stopped state.

However, such a conventional motorized wheelchair cannot be moved laterally with the rider remaining face forward since the motor-operated wheels cannot be pivoted so that they are directed sideways with respect to the rider. This restriction in movement interferes with the rider's ability to utilize the wheelchair completely, to move with total freedom of motion, and to perform certain functions that would typically be available only through lateral motion as, for example, painting on a horizontally-elongated surface or writing on a blackboard. Moreover, currently known drivewheel control arrangements further restrict the range of wheelchair movements in additional ways and may thereby limit a user's flexibility of motion along particular paths or directions of travel.

Traditional steering assemblies for wheelchairs are intrinsically restricted in their freedom of motion as a consequence of their design. Such assemblies typically provide a centralized steering device having transmission members attached to the drivewheels for organized and controlled cooperative motion between the wheels. For example, U.S. Pat. No. 4,852,679 to Fry discloses a series of four wheels pivotally movable about vertically-oriented axes. The four wheels are not, however, each independently so pivotable but, rather, are tied together by chains for commonly-steered pivotally-rotative positioning. In other words the positioning is achieved by a central, motorized transmission device causing the wheels to move in-tandem, not independently.

Another example of known arrangements is disclosed in U.S. Pat. No. 4,513,832 to Engman, in which a chassis incorporates three pairs of wheels. Each pair of wheels of the two outer (that is front and rear) sets are freewheelingly, independently pivotable about substantially vertical axes, while the wheels of the central or interior wheel sets are nonswivelably attached to the chassis structure and are motor driven for effecting driven movement of the wheelchair along a support surface.

Nora, et al. (U.S. Pat. No. 4,483,805) addresses the problem of lateral motion by disclosing rear drivewheels that are independently driven by separate electric motors and are pivotally movable about substantially vertical axes. However, as in the other prior art drivewheels, pivotable movement is effected in-tandem, in that simultaneous adjustments are made to the relative rotative positions of the wheels as the wheelchair is selectively steered. In addition, each of the rear drivewheels is limited in the extent to which it is pivotable about a respective kingpin that attaches it to the frame, since each drivewheel is operated in-tandem with the other and armatures protrude from each drivewheel assembly thereby preventing the drivewheel from pivoting in a complete circle. Thus, although the Noda, et al. device permits pivoting of the drivewheels for achieving lateral motion, the device does not allow the wheels to be independently turned through a 360° pivot about a substantially vertical axis wherein the kingpin (that attaches the wheels to the chassis) resides. This limitation results in a decrease in the overall performance and movability of the chassis; since the orientation of the wheels of this device cannot move independently, but only in-tandem, they cannot be placed in different lateral orientations relative to the chassis and the effective turning radius of the wheelchair is thus restricted by the finite variety of motions made possible by the in-tandem pivoting of the drive wheels.

OBJECTS OF THE INVENTION

Accordingly, it is an object of the instant invention to provide a wheeled chassis having independently operable drivewheels to permit true omnidirectional motion of the chassis on and along a ground surface.

It is a further object of the instant invention to provide a wheelchair that has a pair of drivewheels, each of which is independently rotable through a full 360° circle about a kingpin which attaches that drivewheel to the chassis.

It is another object of the instant invention to provide a control system utilizing a microcomputer for separately and independently controlling the direction and angular orientation of the drivewheels so as to achieve complete omnidirectional motion.

It is a still further object of the instant invention to provide a joystick control means and a user-interfaceable mini-keyboard connected to control system for permitting the user to selectively move the wheelchair device in virtually any desired direction.

It is yet another object of the instant invention to provide a wheelchair with a substantially infinite variety of turning radii, from the tightest turning radius possible with the use of two separate and independent drivewheels (i.e., a turning radius substantially equal to one-half the distance between a drivewheel and an adjacent free-spinning front wheel) to one approaching an almost infinite turning radius wherein the limit thereof resembles lateral motion.

A still further object of the instant invention is to provide a control system for separate and independent orientation of each of the drivewheels of a wheelchair assembly with dynamic sensing and control of the orientation and placement of the wheels.

SUMMARY OF THE INVENTION

The foregoing objects and other objects and advantageous features of the instant invention are achieved by the provision of a wheeled chassis with independently pivotally-driven drivewheels for omnidirectional motion, having a frame preferably rectangular with at least three wheel-attachment points; at least one and preferably a pair of free-spinning wheels each rotatably attached at or proximate two of the corners; first and second drivewheels, each of which is connected by a kingpin at or proximate the remaining attachment points on the frame; first and second pivoting assemblies for controlled, independent and unrestricted 360° pivoting of each respective kingpin of each respective drivewheel about a substantially vertical axis; the first and second pivoting assemblies cooperatively determining a direction of travel of the chassis; and first and second drive devices each operatively connected to a respective drivewheel for moving the chassis in the determined direction of travel. The invention further includes a control system, typically including a microcomputer, a keyboard and a user-operated joystick, which are operatively connected to the pivoting assemblies and the drive devices, and which control the direction and speed of travel of the chassis. The invention also includes sensors which determine the angular orientation of the drivewheels with respect to the chassis, such that the control system is fed data correlating with such configuration and from, the dam, determines the direction of travel.

The rider of the novel inventive electric wheelchair of the invention can therefore operate it in generally the same manner as other standard types of electric wheelchairs, and, in addition, can effect driven movement of the wheelchair in virtually any direction, whether the path of travel is straight or curved. This means that the body of the rider can face any direction while travelling, and not just forward relative to the direction of travel. In addition, the electric wheelchair of the invention can be rotated in circles, as with a conventional electric wheelchair, but in a greatly reduced area and within a notably reduced circular radius.

It is also a feature of the instant invention that it can be operated to turn in a minimum circle whose diameter is substantially equal to, or just slightly greater than the distance between the center of a drivewheel and a diagonally-opposite freewheel, or along any curved or curvilinear path larger than that minimum circle.

It is another feature of the instant invention that the operation of the wheelchair is achieved by computer-assisted control permitting any type of motion to be preprogrammed such that by entering the appropriate commands, the direction and/or type of motion (such as a minimum circle, sideways or lateral motion, or diagonal or other required motion), can be predeterminately stored, and selectively recalled by a user of the wheelchair from computer memory in rapid and simple fashion.

A further feature of the instant invention is that the user-oriented computer-assisted control of the speed and/or the orientation of the drivewheels can be achieved utilizing a manually-operable joystick type controller disposed within easy reach of the user, the joystick, by sending commands to a microcomputer, directly controlling or adjusting one or both of the speed and direction of rotation of the drive motor and the pivoting motor assembly for such drivewheel.

It is still another feature of the instant invention that each electrical motor-driven drivewheel assembly is independently rotatable by computer controlled keypad which results in the independent rotating of each drivewheel assembly so that an infinite variety of positions of the wheeled chassis can be achieved and hence an infinite variety of wheelchair motions on or along the ground surface are made possible.

BRIEF DESCRIPTION OF THE DRAWINGS

Other objects and many of the attendant advantages and features of the present invention will be readily appreciated and better understood by reference to, and through consideration of, the following detailed description of the invention together with the accompanying drawings, wherein like reference numerals designate similar parts throughout the figures thereof, and wherein:

FIGS. 11A and 11B are further top plan operational views, showing attainable angular orientations of the drivewheels for determining minimum and maximum radii of curvilinear travel of a wheelchair in accordance with preferred embodiments of the instant invention; and FIG. 12A, 12B and 12C are top plan operational views showing the comparatively limited degrees of movement provided by prior art devices.

DETAILED DESCRIPTION OF THE PREFERRED EMBODIMENTS

Figure 1:
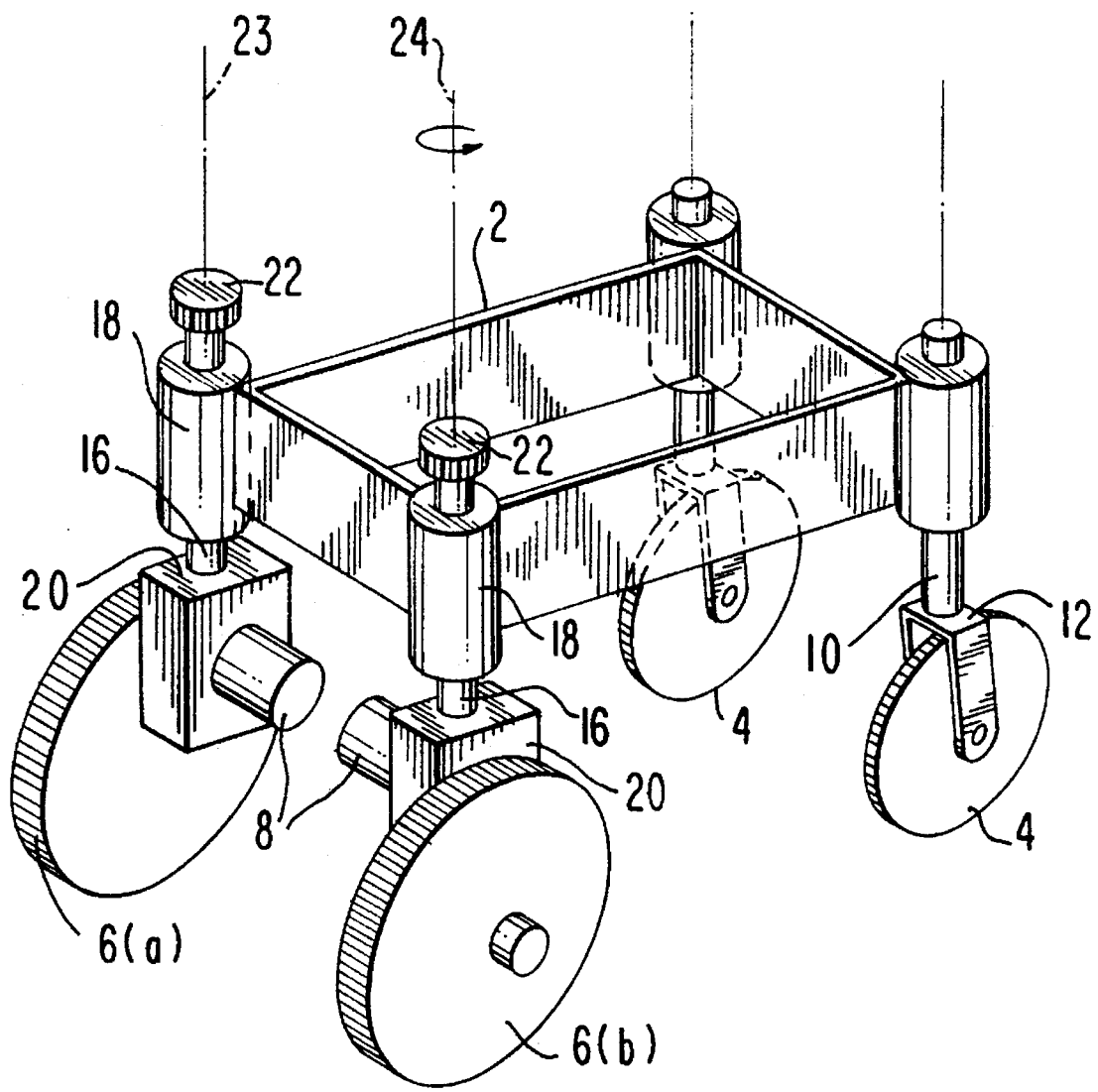
FIG. 1 is an elevated perspective view of the frame, wheels, and drive assemblies of a wheeled chassis constructed in accordance with the teachings of the instant invention.

In FIG. 1, a wheeled chassis 1 is shown in accordance with a currently preferred embodiment of the instant invention, the chassis 1 including a generally rectangular frame 2 being movable on or along and relative to a usually underlying, supporting ground surface (not shown). It is to be understood that the frame may be constructed in any of a number of suitable shapes, including ovoids, as may be necessary or appropriate for the particular application. For wheelchairs, as a subset of wheeled chassis, the frame 2 will typically be rectangular as shown in FIG. 1. One skilled in the art will be able to select the proper materials for frame 2 which can include, by way of example, steel, hard plastics, and wood, depending on the particular structure and application involved.

At or proximate two of the adjacently-disposed corners of the frame 2, two independently pivoting, free-spinning wheels 4 are positioned. Each of the wheels 4 are attached to the frame 2 by a shaft 10 that extends along an axis defined generally normal or perpendicular to the ground surface and links to a beating assembly 12. The assembly 12 may be of the ball bearing or similar type to provide complete freedom of axial rotation of the shaft 10 relative to the frame 2. Assembly 12, at its lower portion, connects to a hub 14 of the wheel 4. The wheel 4 thereby freely rotates in a substantially horizontal plane as a follower to conform with the direction of travel, and in a substantially vertical plane during travel, of the chassis 1 along the ground surface. Wheels 4 may be swivel casters or any other types of wheels that enable the wheeled chassis 1 to move in its many directions. A simple free-spinning wheel 4 may alternatively be used with, for example, a triangular chassis or placed midway or otherwise between two adjacent corners of the frame 2 of a rectangular chassis, as called for by the particular application.

Figure 2:
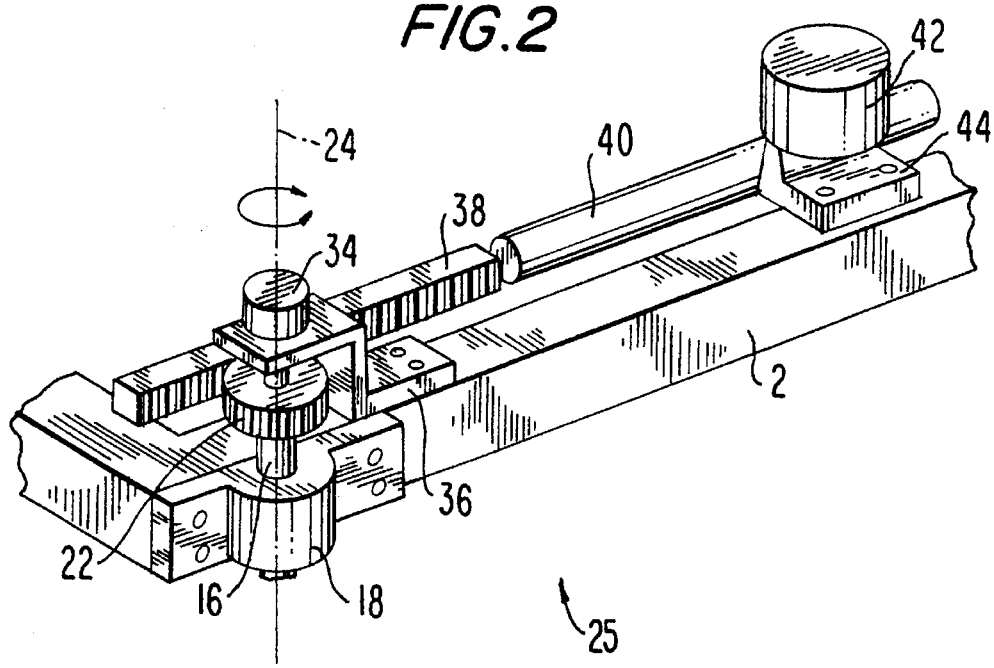
FIG. 2 is an elevated, perspective view, partly broken away, of an apparatus for the angular positioning of the drivewheel assemblies of the instant invention, showing a portion of the wheelchair frame 2 and a drive mechanism for pivoting a wheel 6(b) about an axis 24.
Figure 3:
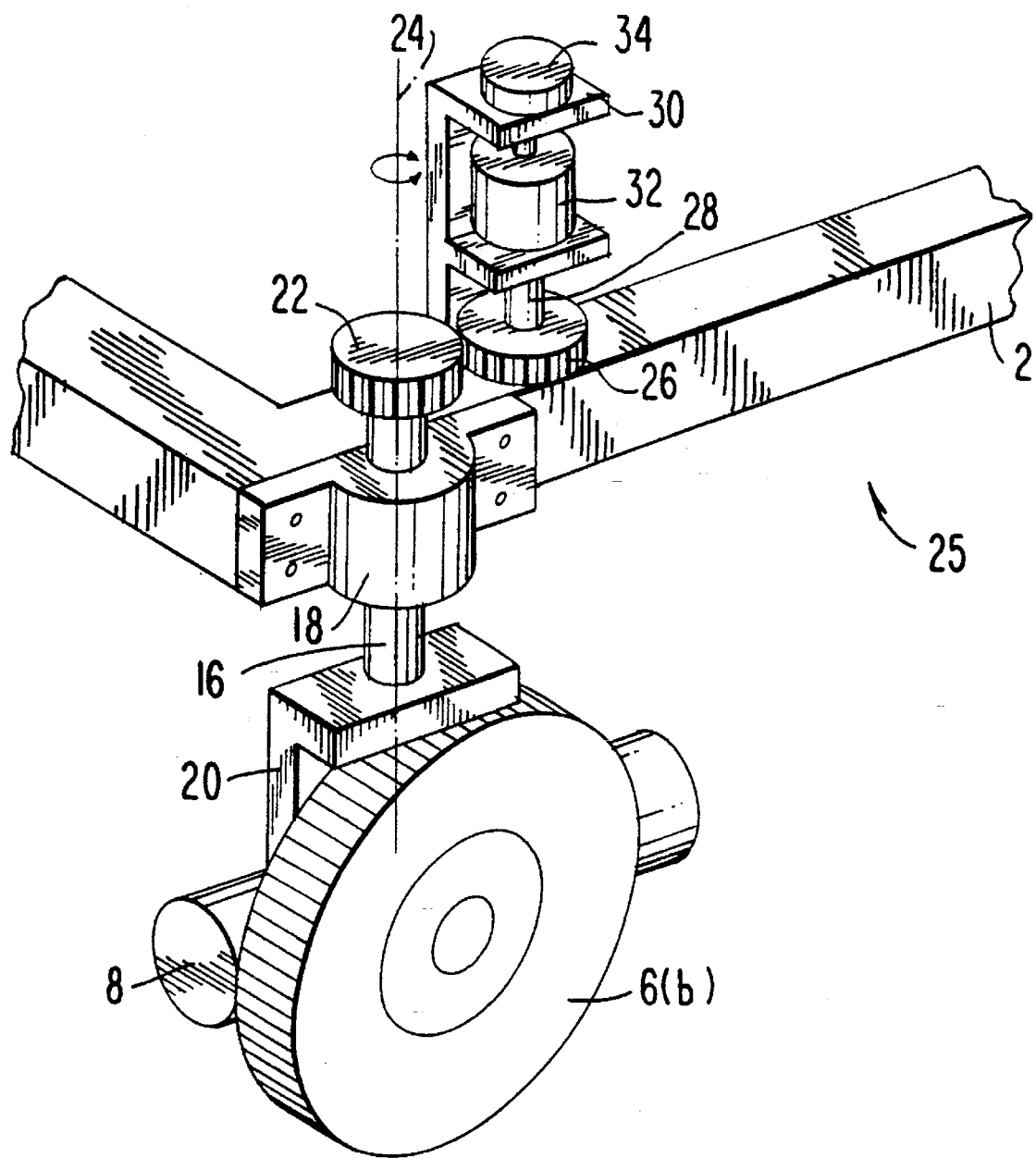
FIG. 3 is an elevated, perspective view of an alternative embodiment of an apparatus for angular positioning of the drivewheel assemblies of the instant invention, also showing a portion of the wheelchair frame 2 and a drive mechanism for pivoting a wheel 6(b) about an axis 24.

Two drivewheels 6 are positioned in the remaining two adjacent corners of the frame, and, for ease of description, are designated drivewheel 6(*a*) for the left drivewheel and 6(*b*) for the right drivewheel. Each such drivewheel 6 is attached by a kingpin 16 to the frame 2. Each kingpin 16 at its upward end passes through a channel 18 in the frame 2 containing a bearing assembly to provide freedom of selectively controlled pivotal rotation about an axis defined substantially normal to the supporting ground surface. The top end of each kingpin 16 protrudes beyond the top surface of the frame and has rigidly connected thereto a drive gear 22 for engagement with a rotative mechanism, two variations of which are shown in FIGS. 2 and 3, respectively, to vary and fix the angular orientation of each kingpin in a generally horizontal plane. Thus, the rotative mechanisms pivotally rotate the left drivewheel 6(*a*) about a substantially vertical axis 23, and the right drivewheel 6(*b*) about a substantially vertical axis 24. The combined pivotal rotations of the left and right drivewheels about axes, 23, 24 determine the direction of travel of the wheeled chassis 1 when both drivewheels are driven at the same speed and in the same direction, as further described below.

The lower portion of each kingpin 16 in FIG. I is rigidly attached to a drivewheel assembly 20 which comprises a variable speed, bidirectional drive motor 8, typically a DC motor, which rotably drives the respective drivewheel 6 in the forward or reverse direction. Drive motors 8 may be geared to drivewheels 6 in any of a number of known gearing assemblies (e.g., a differential). It should be understood that each drivewheel 6(*a*), 6(*b*) has a separate drive motor 8, and that no linkage or transmission device directly mechanically attaches the drivewheels 6 to one another for coordinated motion. Rather, coordinated motion or relative rotation is provided by the control system, as further described below. It should also further understood that as a consequence of the lack or absence of any transmission device or mechanical drive connection or linkage between the drivewheels 6 for in-tandem operation, each drivewheel 6 is capable of being pivotally rotated about its respective steering axis 23, 24 in a complete 360° circle, without interference or impediment. The attainable radius of curvature of motion of the wheeled chassis 1 thereby equipped starts at a minimum of about one half the diagonal distance between the drivewheels and the freewheeling front wheels with a maximum that approaches a straight line (i.e. lateral motion), and includes a continuous range of radii therebetween.

FIG. 2 illustrates a first embodiment of a rotative positioning mechanism 25, in this instance for the right drivewheel 6(*b*). A separate such mechanism 25 is also present for drivewheel 6(*a*), in mirror-image relation to that shown in FIG. 2. The kingpin 16 is seen passing at its lower end through the bearing 18 which is attached to the frame 2, and carrying at its upper end a drive gear 22 mounted thereon. The drive gear 22 is toothed to cooperate with an elongated and similarly toothed drive rack 38. The drive rack 38 preferably has sufficient teeth to engage the gear 22 and to pivot the kingpin 16 through a full 360° rotation circle. The rack 38 is, in turn, attached to an electric linear actuator shaft 40 which engages an electric linear drive motor and optional gearing assembly 42 that is mounted to the frame 2 via a hold-down unit or clamp 44. The drive motor 42 may be a stepper or other DC bidirectional motor to enable selective linear advancement and retreat of the actuator 40. As the motor and gearing assembly 42 is engaged, it moves the gear 22 and pivots the kingpin 18 causing rotation of the drivewheel 6(*b*) about the axis 24 in either the clockwise or counterclockwise direction, as required for a particular motion of the chassis 1 along the ground surface.

Figure 6:
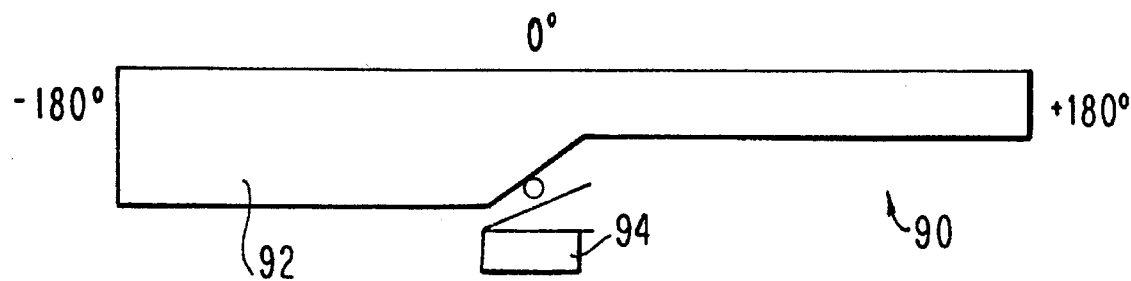
FIG. 6 is a diagrammatic representation of a mechanism for determining the home position in the pivoting of a drivewheel assembly.
Figure 7A:
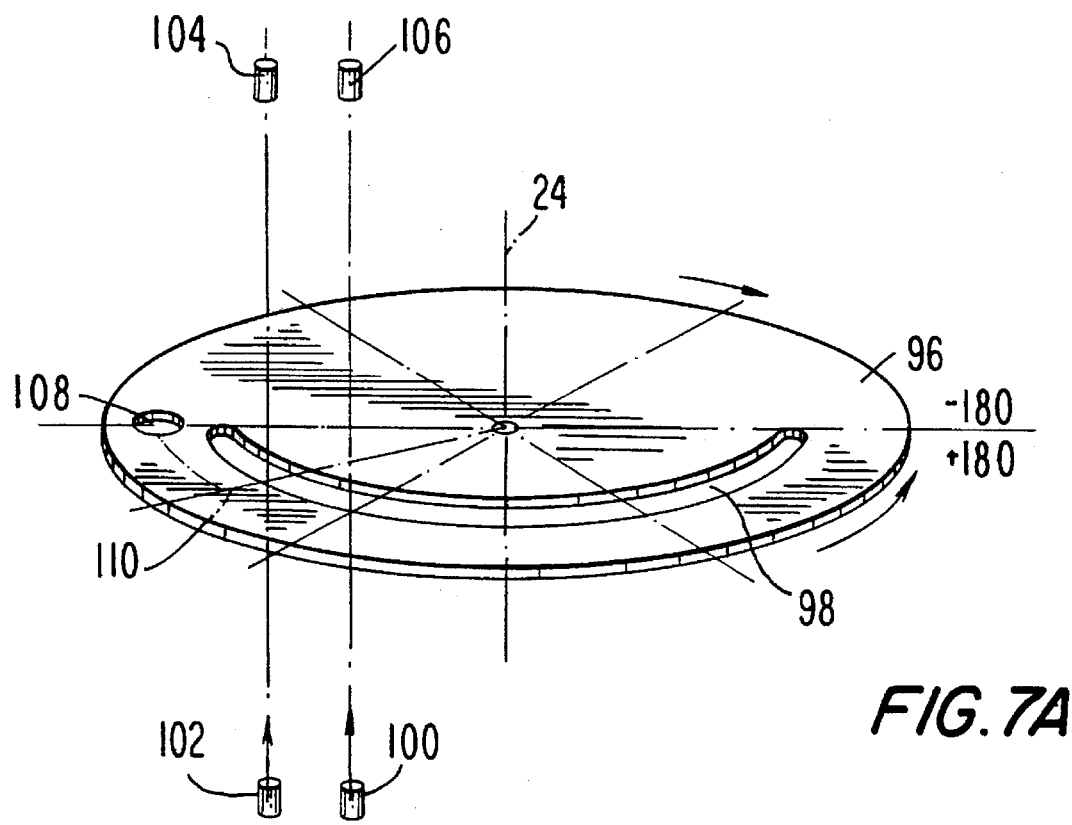
FIGS. 7A and 7B are diagrammatic representations of an alternative embodiment of a home position sensor for the drivewheel assembly utilizing light beams and phototransistors.
Figure 7B:
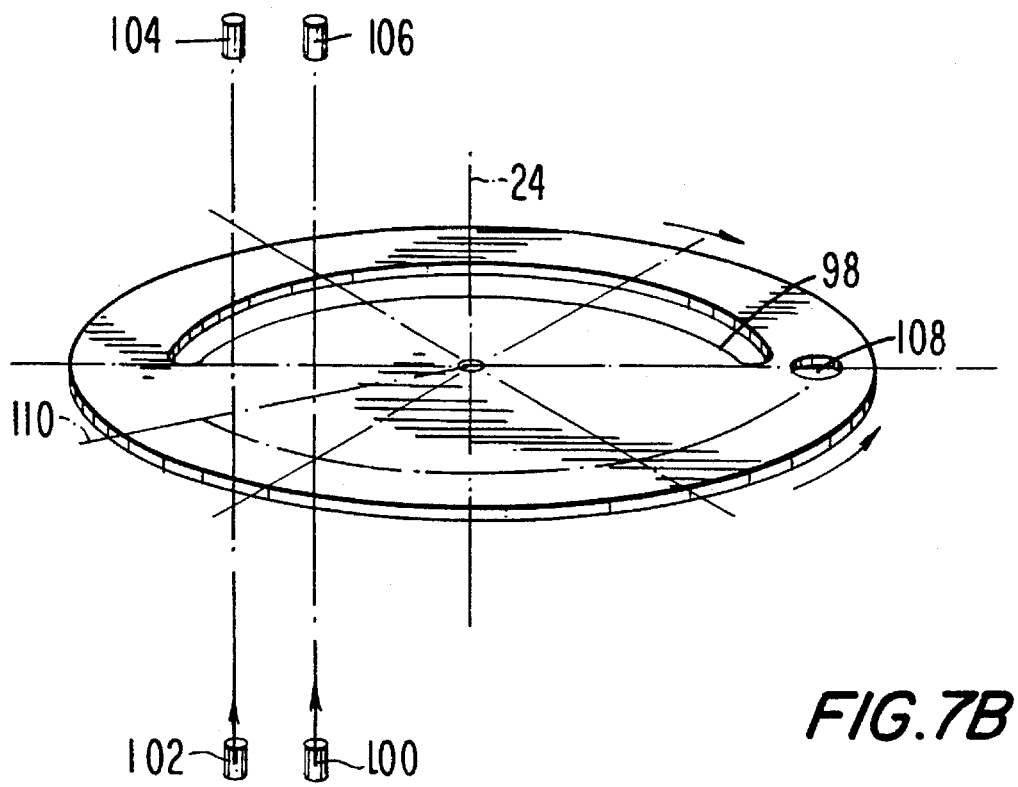

Also shown in FIG. 2 is an angular position sensor 34, two alternative variations of which are detailed in FIGS. 6 and 7, for feeding to the controller dynamically-updated data relating to the then-current angular orientation of the respective drivewheel 6 with which the sensor 34 is associated. Sensor 34 is, in FIG. 2, seen as being attached to frame 2 via a hold-down or bracket 36.

FIG. 3 depicts a second or alternative embodiment of a rotative positioning mechanism 25. Like the embodiment shown in FIG. 2, a separate one of the FIG. 3 mechanisms is positioned in association with each of the drivewheels 6(*a*), 6(*b*) and, in this instance, is shown for drivewheel 6(*b*). Also seen in FIG. 3 is the drive motor 8 for drivingly rotating the wheel 6(*b*) about its substantially horizontal movement axis, the motor 8 being attached to the drivewheel assembly 20 which, in turn, is connected to the kingpin 16 which passes through the bearing 18 rigidly mounted on frame 2. A toothed-driven drive gear 22, carried at the upward end of the kingpin 16, meshedly engages a toothed drive gear 26 which, via a depending shaft 28, is rotable by a DC stepper motor 32 for pivoting the drivewheel assembly 20 about the axis 24. Thus, a gear train is formed by the drive gear 26 and driven gear 22. The angular position sensor 34 is shown in the FIG. 3 embodiment just above the stepper motor 32, as part of the positioning bracket assembly 30 that is mounted on the frame 2.

In each of the FIG. 2 and FIG. 3 embodiments of the rotative positioning mechanism 25, the "zero" degrees home or reference portion may be arbitrarily set such that the angular orientation of each drivewheel 6 is substantially parallel to each side of the frame 2 for movement of the chassis 1 in a straight line path in either the forward or backward direction. Any angular or rotative displacement from the "zero" or home position will provide when the drivewheels 6(a), 6(b) are concurrently rotated at the same speed and rotative sense a particular and different direction. Thus, the only limitation in width of the chassis 2, i.e., in the distance between the kingpins 16, is that such width must be sufficiently large for accommodating the drivewheel assemblies without these assemblies interfering with each other during orientation-related motion of the wheels. In other words, the width of the chassis 2 must be at least just slightly greater than the sum of the radii of the drivewheels 6, or the sum of the lengths of the drive motors 8 in embodiments wherein the drive motors 8 are longer than the diameters of the drivewheels 6.

Figure 4:
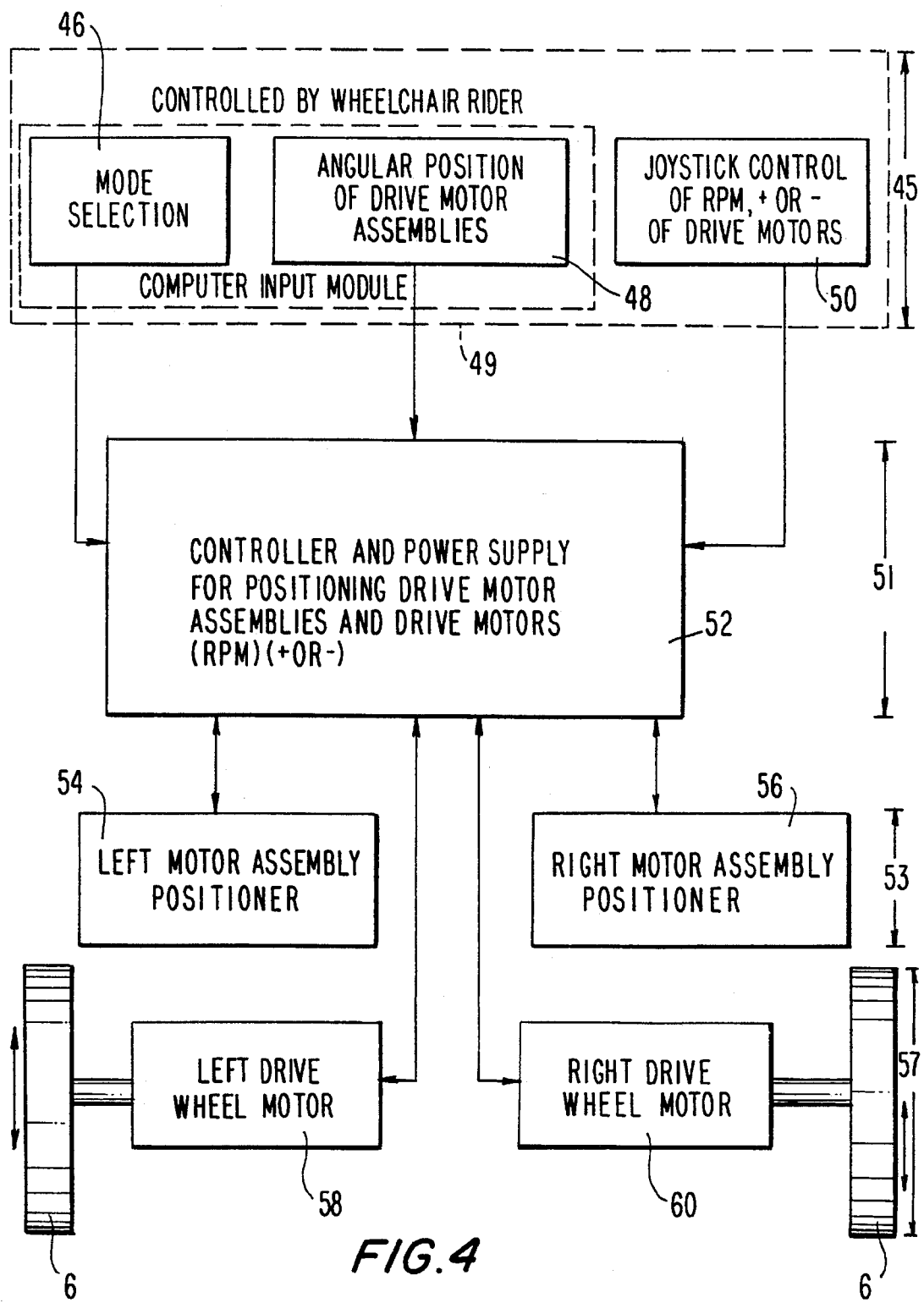
FIG. 4 is a modular block diagram schematic of the control system of the invention.

FIG. 4 depicts a block diagram schematic of a control system for use in a wheeled chassis constructed in accordance with the instant invention. The control system is essentially formed of four quadrants of operating components: a quadrant 45 under the control of an operator of the wheeled chassis, a quadrant 51 comprising a controller and power supply, a quadrant 53 comprising the rotative positioning mechanisms, and a quadrant 57 comprising the drivewheel motors 8 and associated drivewheels 6.

In quadrant 45, a computer input module 49 and a manually-operable joystick controller 50 provide an interface for the user or operator of the wheeled chassis. It should be recognized that these operator interface components may be remotely located as in a hand-held remote control device, with the activating signals or data transmitted and confirming signals and the like received by a number of known mechanisms, including any of those commonly known and used for remote control operations, so that the wheeled chassis may be employed as a mobile platform for selectively transporting articles in a desired environment or application. In a preferred embodiment, the wheeled chassis is a wheelchair and carries a seat for a user and operator thereof, and the controller quadrant 45 is positioned within easy reach of the operator, typically on one or both arms of the wheelchair. In such an embodiment, the computer input module 49 may be positioned on one arm of the chair, and the joystick controller 50 on the other arm of the chair.

Figure 5:
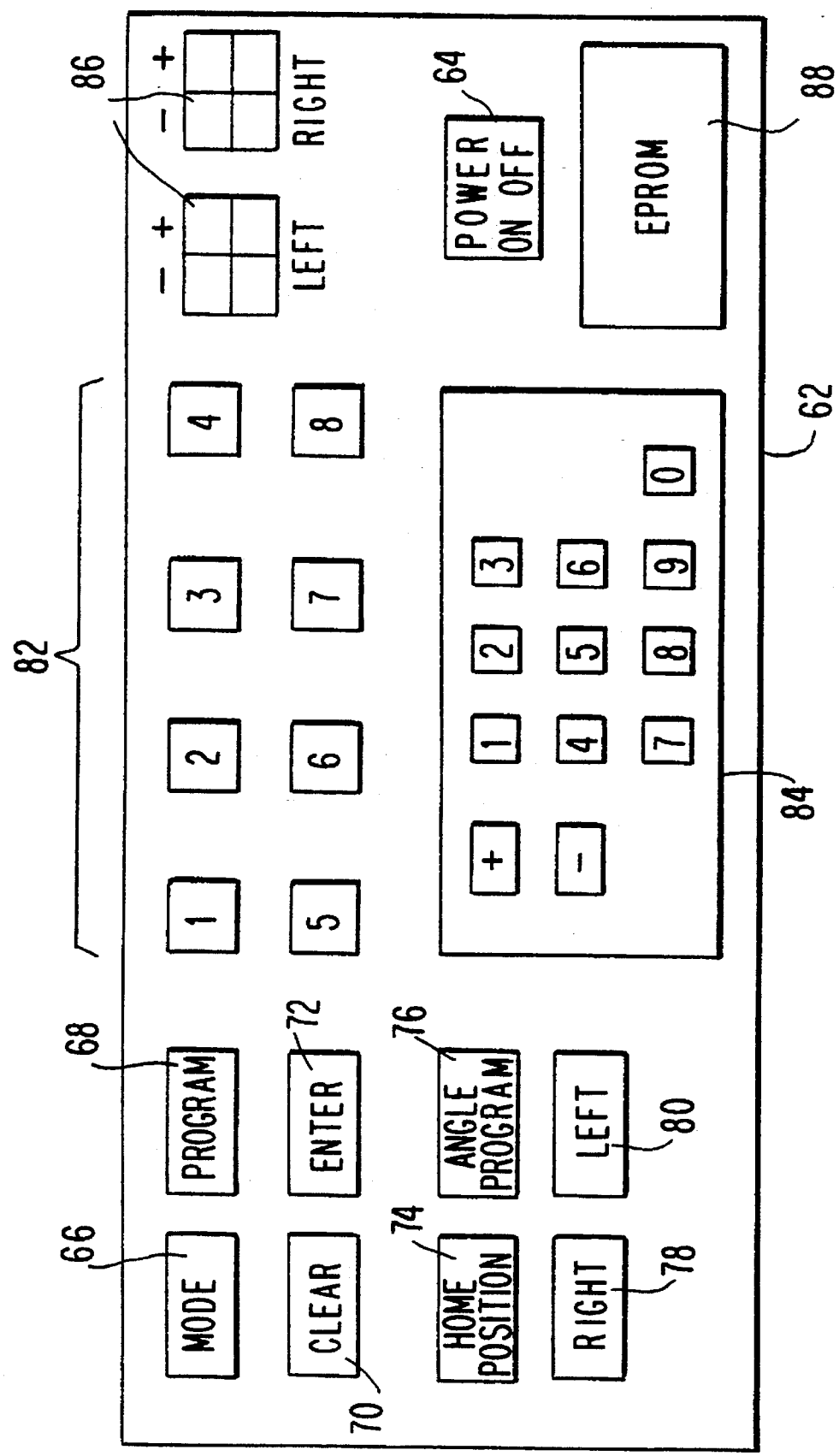
FIG. 5 is a top plan view of an input keyboard for a microcomputer-assisted controller or the instant invention.

The computer input module 49 is indicated in FIG. 4 as having a mode selection module 46, for selection of the mode of operation, and an angular position module 48 for selective angular orientation of each of the drivewheels. A preferred embodiment of such a module 48, in the form of a keypad or keyboard 62, is shown in FIG. 5 and described in greater detail below. Joystick controller 50, illustrated in greater detail in FIG. 8, permits the operator to manually and selectively control the speed (i.e., rpm) and direction of motion of the chassis 1 along the ground surface by selective reorientation and positional adjustment of a pivotally movable arm of the joystick.

Controller and power supply module 52, shown in quadrant 51 of FIG. 4, receives data input from the user-controlled quadrant 45 and adjusts and monitors the angular positions and rotative speeds and senses of the various drive motors. Thus, quadrant 51 interfaces with the user-controlled quadrant 45 on the one hand, and on the other with both the left and right rotative positioning assemblies 54, 56 and the left and right drive wheel motors 58, 60. The positioning assemblies 54, 56 are interactive, i.e., they both receive data from the controller 52 and inform the controller 52 of their angular positions via the positioning sensing mechanisms shown by way of example, in FIGS. 6 and 7. Likewise, the left and right drivewheel motors 58, 60, respectively, can be rendered interactive with the provision of sensing devices (not shown), or may simply be fed an engaging signal for forward or backward rotating operation, dependant upon the input from user-interface quadrant 45.

FIG. 5 depicts a preferred embodiment of the user-interface computer controller keypad 62 for receiving and translating the user's commands into an orientation angle for each of the drivewheels, for informing the user of the then-current angular orientations of the wheels, and for storing both the angular orientations and preprogrammed orientations. This controller allows the user to preprogram a series of directions and/or motion sequences in the programmed instruction portion 82 at program recall buttons 1 through 8 which will, by way of example, set a home orientation of zero/zero (right/left) of the drivewheels such that each lies substantially parallel to the respective side of the frame 2 and for moving the chassis 1 in a straight line, forwards or backwards, when the drive motors 8 are operated together. These buttons can also, for example, set a position of right +90°/left −90°, for sideways motion, or any other combination to provide a minimum circle, diagonal to the right, diagonal to the left, or any other desired path (see FIGS. 9, 10 and 11).

The instructions may be stored and maintained via, e.g., a separate battery backup, or the unit may be powered by the DC batteries that operate the drive and pivot motors. The software, and/or present operating modes and sequences, may be up and downloaded through an eprom 88. An automatic home position button 74 may also be provided to enable ready present access to the zero/zero position by the push of a single button, and may also be preset prior to delivery of the wheeled chassis.

Figure 9A:
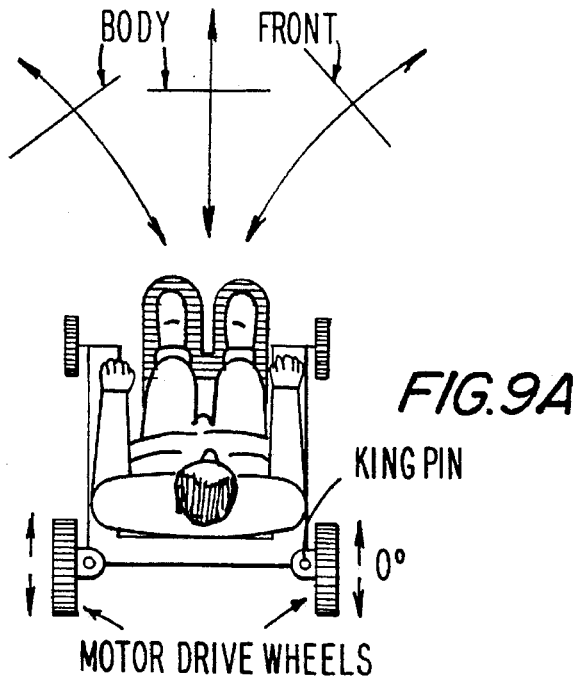
FIGS. 9A, 9B, 9C and 9D are top plan operational views, showing some of the many possible motions, directions, and angular positions of the drive assemblies in accordance with the preferred embodiments of the instant invention.
Figure 9B:
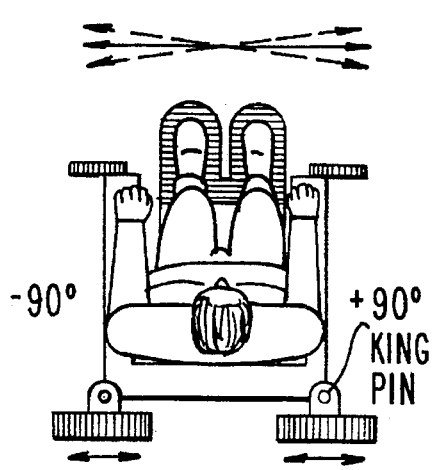
Figure 9C:
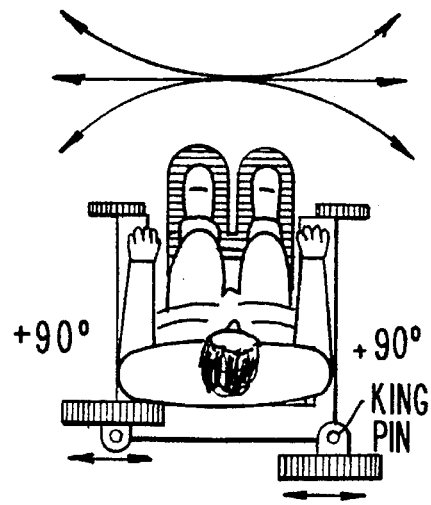
Figure 9D:
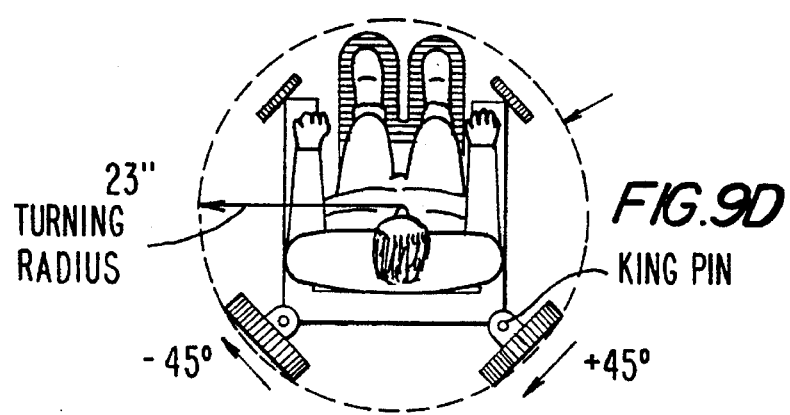

It should be understood that, in this description, positive angular orientation means turning or pivoting of the respective drivewheel 6 about its axis 23 or 24 to the right (i.e. clockwise) from zero, and negative to the left (i.e. Counter-clockwise) from zero. Thus for example the phrase "right +90°/left−90°" indicates that the right drivewheel 6(b) has been pivoted to the right and is now perpendicular to the side of the chassis 2 and parallel to the back of the chassis, and that the left drivewheel 6(a) has been pivoted to the left and is now perpendicular to the side of the chassis 2 and parallel to the back of the chassis 2, and that the drivewheels are now parallel and lined-up (FIG. 9B). In this configuration, equal rotation of the two drivewheels will displace or move the chassis 2 in a straight line with the front facing substantially perpendicular to the direction of travel.

Further understanding of the operation and use of the computer controller 62 can be facilitated by reference to several specific examples of its use. Assuming that the power switch is initially "off", the operator pushes power on/off switch 64, and a display is seen in the left and right display windows 86 indicating the respective left and right orientations of the drivewheels 6(a), 6(b). At this point, the operator can press the home position button 74, or can use a preprogrammed button 82 as appropriate or decided. To change the programming of, e.g., button "1" of buttons 82 to the zero/zero home position, the operator first clears the instructions to button "1" by sequentially pressing mode 66, program 68, clear 70, and button "1" of buttons 82. The operator then sequentially pushes mode 66, program 68, button "1" of buttons 82, home position 74 and enter 72. In this manner, the system will be oriented to the zero/zero position and button "1" of buttons 82 will have been programmed to again reposition the drivewheels of the wheelchair to their home positions whenever it is pressed.

By way of additional example, the user can program right +90°/left−90° for button "2" of buttons 82 by first clearing any pre-programming on this button by sequentially pushing mode 66, program 68, clear 70, and button "2" of buttons 82. The user then pushes angular program 76, right 70, buttons "+", "9" and "0" of keypad 84, left 80, buttons "−", "9" and "0", and lastly enter 72.

Having thus programmed buttons "1" and "2" in accordance with the foregoing, when button "1" of buttons 82 is pushed, the drivewheels will both zero. When button "2" is pushed, the drivewheels will pivot to right +90°/left−90°. Entering angular information in this manner accordingly allow preprogramming of virtually any possible travel or movement configurations, and combinations of buttons 82 may also be used if required to achieve a multiplicity of more complex preprogrammed configurations.

One skilled in the art is readily capable of providing a counting or monitoring or sensing system that determines, from a home (zero/zero) position, the actual or then current angular orientation of each of the drivewheels 6. For example, each step or sequential position of the stepper motor 32 in FIG. 3 can be calculated as equal to a particular angular displacement of the drivewheels 6 about the respective axis 24, 25. Alternatively, each axial advancement or click of the drive rack 38 in FIG. 2 may be equal to a predetermined angular displacement of the drivewheels 6. Accordingly, as measured from the home position, feedback to the computer controller will enable summing of the clicks or steps and, through a minor computation, permit dynamic monitoring or sensing of the angular orientations of the drivewheels 6.

A mechanism for determining or verifying the home position of the drivewheels 6 is shown in FIG. 6, wherein a sensory system 90 is presented for locating the zero/zero position of the drivewheel assemblies, with respect to their present location, in conjunction with the drive rack embodiment of FIG. 2. This sensory system is important, principally, when the system is first turned on, or when the home key 74 is depressed for rapid return to the zero/zero position which, as mentioned hereinabove, places the drivewheels substantially parallel to the sides of the frame 2 of the chassis 1. The mechanism includes a cam 92 that is substantially equal in length to and connected for movement with the drive rack 38 (FIG. 2) and has, at its mid-point, a transition slope connecting a thin width portion at one end of the cam 92 and a thick width portion at the opposite end of the cam. A microswitch 94 is rigidly attached to the frame 2 (FIG. 2) at a position and location such that with the respective drivewheel at its zero position, the switch lies at and actuatingly adjacent the longitudinal midpoint of the cam 92. To "zero" the system during use of the wheeled chassis, the microcomputer controller keyboard 62 shown in FIG. 5 in actuated by pushing the home key 74, and the zero position is found as follows:

(1) If microswitch 94 is in the "open" condition, then the drivewheel 6 must be located between 0° and +180°. The controller therefore sends power to the linear actuator 42 to move the rack 38 and cam 92 to the fight until microswitch 94 closes. Immediately upon closure of the microswitch 94, the drivewheel 6 has returned to its zero position, and movement by the actuator 42 ceases.

(2) If the microswitch 94 is in the "closed" condition, then the drivewheel 6 must be located between 0° and −180°. In this instance the controller sends power to the linear actuator 42 to move the rack 38 and cam 92 to the left until microswitch 94 opens. Immediately upon opening of the microswitch 94, the drivewheel 6 has returned to its zero position, and movement by the actuator 42 ceases. Thus, no matter what the starting positions or orientations of the drivewheels 6, the home position (zero/zero) can always be readily identified and regained.

FIG. 7 illustrates an alternative apparatus and arrangement for locating the home position when a stepping motor 32 is used as in the pivoting mechanism as shown in FIG. 3. The FIG. 7 device may also be used in place of the FIG. 6 device for the actuation system shown in FIG. 2. Disposed within the angular position sensor 34 in this second or alternative embodiment is a sensor disc 96 having a slot 98, and two light sources 100, 102 which are aligned on opposite sides of the disc 96 with two phototransistors 106, 104, respectively. When the slot 98 is positioned below phototransistor 106, light source 100 shines through the slot and the circuit is completed. Likewise, when the hole 108 is positioned below the phototransistor 104, light source 102 shines therethrough and completes a circuit. Completion of the circuit connection through hole 108 inhibits the zero position for the respective drivewheel whereas circuit completion through slot 98 indicates a non-zero position with rotation of the drivewheel having proceeded through no more than 180°.

Thus, the following procedure can be used for determining the home position using the device of FIG. 7:

(1) Since the disc 96 is attached with its center coincident with the axis 24 or 25 of rotation of the respective kingpin, i.e. left or right, if the phototransistor 106 is illuminated and thereby actuated by light passing through the slot 98 from the light source 100 (see FIG. 7A), the stepping motor is engaged to pivot either the drive gear 26 (FIG. 3) or the drive rack 38 (FIG. 2) in a counterclockwise direction until the hole 108 aligns with and allows light to illuminate the phototransistor 104. As soon as such illumination occurs, the motor ceases to pivot the drivewheel, having found its home location.

(2) If the phototransistor 106 is not illuminated by light passing through slot 98 from light source 100 and phototransistor 104 is not illuminated by light from source 102 (see FIG. 7B), then the motor drives the gear in a clockwise direction until the hole 108 aligns with and allows light to illuminate the phototransistor 104 through hole 108. As soon as such illumination occurs, the motor ceases to pivot the drivewheel, having found its home location.

It should also be appreciated that the slot 98 shown in FIG. 7 may alternatively be formed as a series of calibrated and spaced apart apertures, the spacing of which correlate with particular angular displacements of the drivewheels, so that a counting system may be established with, e.g., an additional phototransistor and light source and the computer controller, by summing the illuminations or flashes, will at all times know or be able to determine the exact orientation of each drivewheel.

Figure 8A:
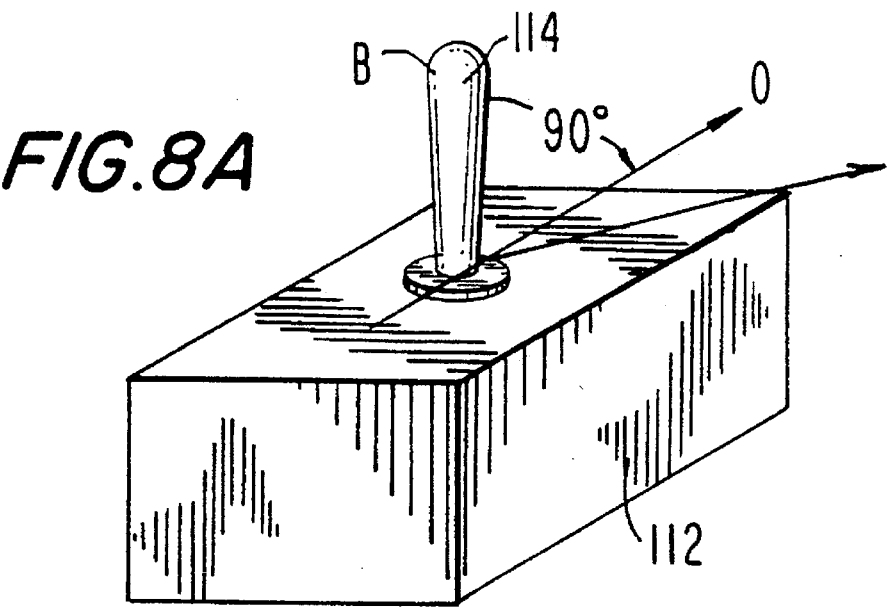
FIGS. 8A and 8B are perspective and top plan views, respectively, of a joystick, illustrating the movements required of the joystick for selectively adjusting the angular orientation and speed of travel of the wheel assemblies.
Figure 8B:
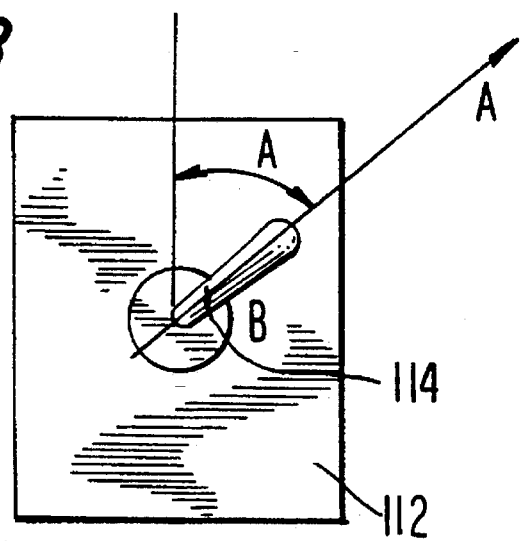

FIG. 8 shows a manually operable joystick directional and speed control which can be used to drive the wheels in-tandem with the computer controller maintaining the in-tandem positioning. It should be understood that such a joystick speed controller can be used in conjunction with the computer keypad 62 shown in FIG. 5, such that once the angular orientation of the drivewheels is set, the user can adjust at least the speed of movement with the joystick. It should be further understood that two joysticks can be alternatively employed, each for individual control of each respective drivewheel. Selection between these various embodiments can be made by these skilled in the art with the assistance of the teachings contained herein to satisfy the particular application intended or contemplated.

In the embodiment shown in FIG. 8, the computer controller (FIG. 6) may have a preprogrammed function at, e.g., button "8" of the controller buttons 82 which, when engaged, can commence automatic joystick control for both speed and direction. It should be understood that the movable arm or joystick 114 of the joystick controller 112 can have two variations in movement, i.e., it is adjustable in two types of dimensions. Sitting in its waiting state, the arm 114 resides in a vertical plane that is perpendicular to the plane of the top surface of the controller 112, as shown in the lower part of FIG. 8. When the joystick 114 is displaced in an angular direction "A", i.e. within the plane of top surface of the controller 112, the rotative positioning mechanisms 25 are actuated for each of the right and left drivewheel assemblies 6(a), (b) and these assemblies are thereby each pivoted about their axis 23, 24 to a final orientation that correlates with the extent of displacement of the joystick 114. The chassis can next be driven in the direction of the drivewheel assemblies having been set by the joystick. Thereafter, the speed of the drivewheels 6(a), 6(b) will be proportional to the angle of displacement B, i.e. a displacement angle between the vertical plane and the horizontal plane of the top surface of the controller 112. A time delay is included to provide for actuation of the rotative positioning mechanisms 25 prior to the drive motors 8 to enable orientation of the directions of the respective drivewheels before travel of the chassis on and along the ground surface. Under an alternative embodiment, a circular zone is positioned around the joystick 114 for orientation of the drivewheel 6, and a donut-shaped zone beyond the orientation zone for speed control. When the joystick 114 is positioned in the circular zone, the drivewheels are pivoted and when the joystick 114 is positioned in the donut-shaped zone, the drive motor 8 are activated. A light is also provided to indicate that the drivewheels 6 are orientated in the proper direction.

Figure 10:
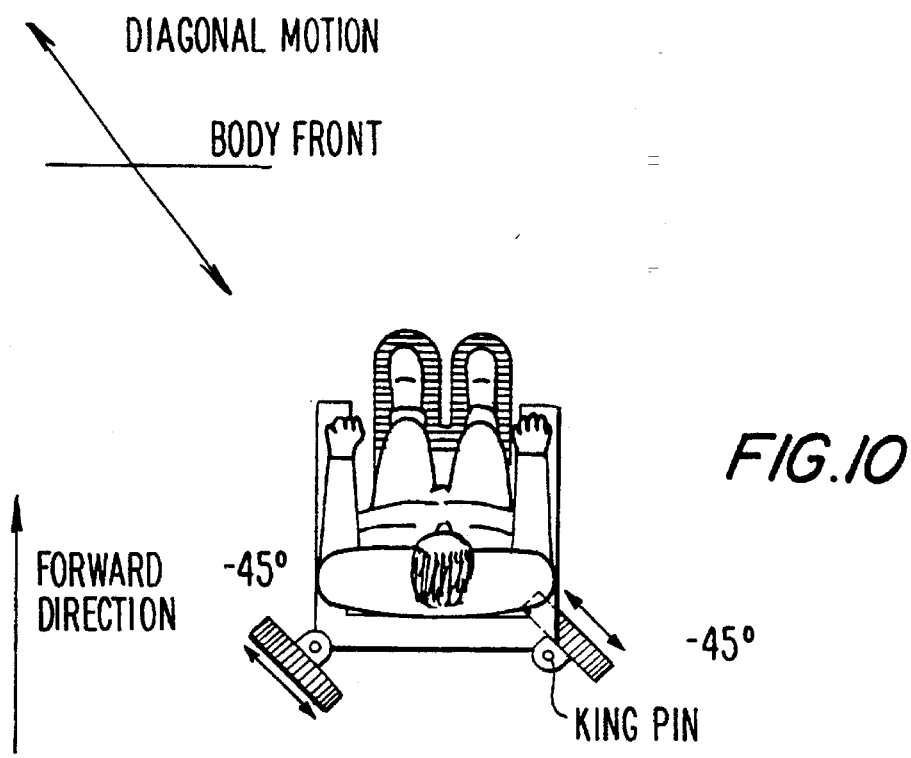
FIGS. 10A and 10B are top plan operational views, showing further travel directions and angular positions of the drive assemblies in accordance with preferred embodiments of the instant invention.

FIGS. 9, 10 and 11 show various illustrative orientation angles of the drivewheels, and their effect on the motion of a wheelchair equipped in accordance with the instant invention. In FIG. 9A, the home or zero/zero position is depicted. The wheels are all fully aligned, and the operator can move from this position in any of an almost limitless number of directions, both forwards and backwards. FIG. 9B shows the left–90°/right +90° configuration, wherein the drivewheels are positioned in aligned relation substantially parallel to the rear of the chassis. In this embodiment, lateral motion is possible, with a slight curve, depending upon the comparative diameters between the front wheels and drivewheels (i. e., with no curvature if those diameters are the same). Similarly, FIG. 9C shows a horizontal mode with a controllable curve, as a consequence of a left +90°/right +90° configuration. Finally, FIG. 9D shows the minimum turning radius made possible by the instant invention (in comparison to the prior art Noda, et al. device of U.S. Pat. No. 4,483,405, see FIG. 12), wherein the drivewheels are position at left –45°/right +45°. With an averaged-sized wheelchair chassis, this embodiment allows a 24" turning radius, with a full circle completed in a 46" diameter space, whereas the Noda, et al. prior art device provides a minimum 42" turning radius and completion of a full circle turn in no less than an 84" diameter space. Thus, the ability to orient the drivewheels in the manner shown in FIG. 9D is particularly advantageous.

Figure 10B:
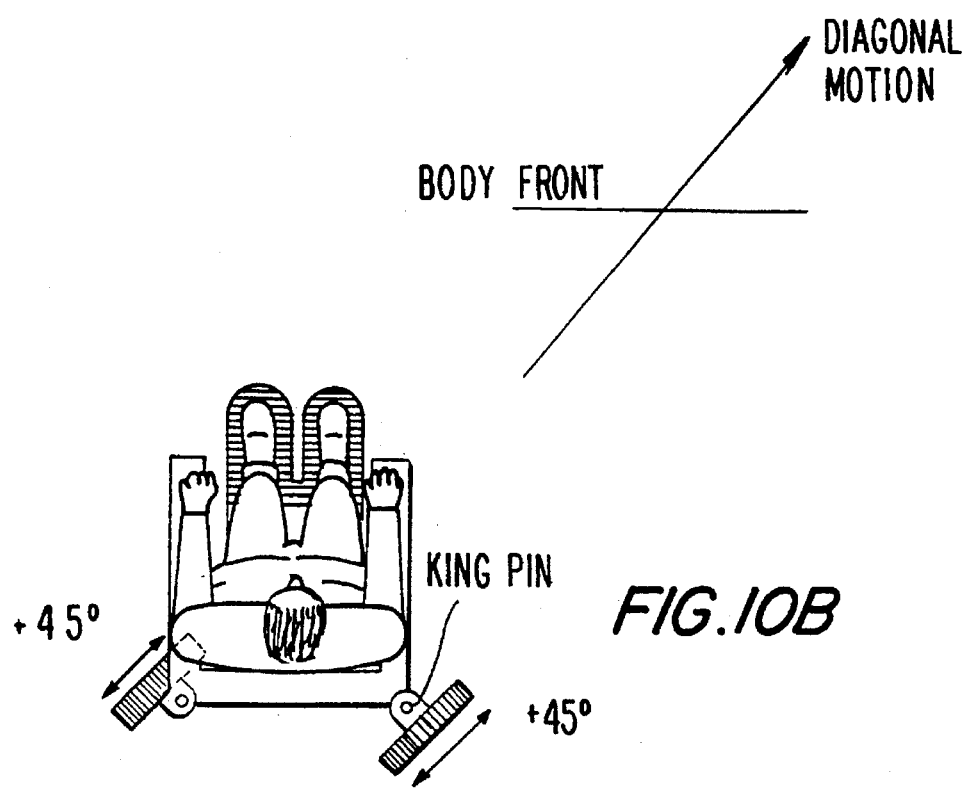

FIG. 10 depicts diagonal motion configurations of the drivewheels 6 for a preferred embodiment of the instant invention. FIG. 10A shows drivewheel orientations of left –45°/right–45° for diagonal motion wherein the body of the user remains face forward, unless the direction of motion is curved by operating the drivewheels 6 at different rotational speeds. Similarly, FIG. 10B shows drivewheel orientations of left +45°/right +45° for diagonal motion in the other direction.

FIG. 11 shows the broadly concave and convex motions that are rendered possible in a wheeled chassis constructed in accordance with the instant invention. It should be appreciated that such motion in a wheeled chassis or wheelchair device has not heretofore been attainable. The radius of circle increases as the drivewheels approach full, parallel alignment for lateral motion (as in FIG. 9B). Thus, in FIG. 11A, where the drivewheels are set for example at left –80°/right +80°, the radius R is quite large, and the operator faces the center of the circle. In FIG. 11B, the opposite is shown, that is the drivewheels are set at left–110°/right +110°, which also results in a circle with an unusually large radius R but in which operator faces toward the outside of the circle. Thus, it should be appreciated that a virtually unlimited number and variety of such combinations may be established and implemented, wherein R may range from a very small number to approaching infinity.

Finally, FIG. 12 illustrates the drawbacks and deficiencies of the prior art Noda, et al. device of U.S. Pat. No. 4,483,405 for comparison with the instant invention. In particular, although the Noda wheelchair is capable of providing similar home (compare FIGS. 12A and 9A) and horizontal (compare FIGS. 12B and 9B) operating mode orientations of the drivewheels, rotation of the Noda wheelchair about a complete 360° circle-achieved by Noda through concurrent opposite-sense rotations of the two drivewheels-requires a significantly larger area than the wheeled chassis of the present invention wherein the drivewheels are independently pivotable to the FIG. 9D orientations for such a maneuver. Thus, the Noda, et al. device requires a minimum circular turning radius of at least approximately 42" (assuming conventional wheelchair dimensions), far larger than that of the instant invention for a similarly-sized device.

Those skilled in the art will readily recognize and appreciate that numerous modifications and variations of the exact embodiments of a wheeled chassis as herein illustrated and described may be made and are, in fact, within the fully intended scope of the invention. For example, although it is the rear wheels 6 of the chassis 1 that have been disclosed as being powered for selective, independent rotation and pivotability, with the front wheels 4 being implemented as followers that are freely and unencumberedly rotatable and pivotable-as for example in a wheelchair utilizing the wheeled chassis of the invention-the powered drive wheels 6 may alternatively be carried at the front of the chassis frame 2 with the freewheeling follower wheels disposed at the rear.

Another particular currently-contemplated modification relates to the wheels 4 which, in the form of the inventive wheeled chassis described hereinabove and shown in Fig. 1, are freewheelingly rotatable about respective rolling axes defined substantially parallel to the underlying ground surface and, in addition, are connected or mounted to the frame 2 for unencumbered pivotal rotation relative to the frame about respective pivot axes defined substantially normal to the ground surface. As should be evident, additional selective omnidirectional mobility of the chassis on and along the ground surface may be achieved by mounting the wheels 4 and/or providing suitable selectively operable apparatus or devices for separate and independent powered rotation of the wheels 4 about their respective rolling and/or pivot axes. Put another way, one or, preferably, both of the wheels 4 may be selectively, separately and independently powered for pivotal rotation about their respective pivot axes in much the same manner as are the drivewheels 6(a), 6(b) to thereby enable further enhanced control over the direction and path of movement of the wheeled chassis on and along the ground surface. Similarly, one or both of the wheels 4 may also, or alternatively, be selectively, separately and independently powered for rotation about their respective rolling axes in much the same manner as are the drivewheels 6(a), 6(b) to thereby further increase the powered movement of the chassis on and along the ground surface. Toward these ends each of the wheels 4 may, by way of example, be mounted to the frame 2 utilizing the same arrangement with all of the associated apparatus hereinabove described as that disclosed for the drivewheels 6(a), 6(b). Thus, in one form of a so-modified wheeled chassis constructed in accordance with the present invention each of the four frame-supporting wheels disposed in rolling engagement with the underlying ground surface is separately and independently selectively powered for pivotal rotation about a respective axis defined substantially normal to the ground surface for versatile and controlled omnidirectional movement on and along the surface, and each (or, if desired, less than all four) of the wheels is further separately and independently selectively powered for rolling rotation about a respective axis defined substantially parallel to the ground surface. Such an arrangement maximizes the omnidirectional movability of the wheeled chassis on and about a supporting surface and thereby significantly expands the already-broad range of its utility and of applications to which the wheeled chassis of the invention may be applied.

It is further contemplated that each of the powered wheels or drivewheels of the inventive apparatus be optionally provided with a clutching arrangement by which the drivewheels, individually or together, may be disengaged from the respective drivewheel powering assemblies 20 for freewheeling rotation about their respective rolling axes. This ability to so render the drivewheels 6 freewheelingly rotatable enables, for example, ready manually-effected pulling or pushing or other locational displacement of the wheeled chassis of the invention as or if such unpowered movement should be necessary or desired.

While there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. It is the intention, therefore, to be limited only as indicated by the scope of the claims appended hereto.

What is claimed is:

1. A wheeled chassis having independently pivotable drivewheels for omnidirectional motion, comprising:

a frame;

first and second drivewheels, each said drivewheel being connected by a kingpin to said frame;

at least one free-spinning wheel rotatably attached to said frame;

first and second pivoting means for independent and unrestricted 360° pivoting of each respective kingpin of each respective drivewheel about a substantially vertical axis, said first and second pivoting means cooperatively determining a direction of travel of said chassis;

first and second drive means each operatively connected to a respective drivewheel for moving the chassis in said determined direction of travel;

a control system operatively connected to said pivoting means and said drive means for controlling and changing said direction of travel and for setting a speed of travel of said chassis; and means for sensing an angular displacement of each of said drivewheels with respect to its respective vertical axis;

wherein said sensing means comprises, for each of said drivewheels, a sloped cam and a microswitch, and wherein said sensing means has a first state in which said switch is engaged and a second state in which said switch is disengaged, and the shift between said first and second state correlates with a zero position for said drivewheel.

2. A wheeled chassis in accordance with claim 1, said control means comprising means operable by a user of the chassis for selective user control of the independent operation of each of said first and second pivoting means.

3. A wheeled chassis in accordance with claim 1, said control means comprising means operable by a user of the chassis for selective user control of the independent operation of each of said first pivoting means, said second pivoting means, said first drive means and said second drive means.

4. A wheeled chassis in accordance with claim 2, wherein said user operable means comprises a joystick controller.

5. A wheeled chassis in accordance with claim 3, wherein said user operable means comprises a joystick controller.

6. A wheeled chassis in accordance with claim 1, wherein said sensing means is connected to said control means for monitoring said pivotal rotation of each said drivewheel relative to said frame about said respective vertical axis.

7. A wheeled chassis in accordance with claim 1, further comprising a seat on said frame for accommodating a user of said chassis as a wheelchair.

8. The chassis of claim 1, wherein said control system comprises a joystick controller having a plurality of positions for selective operation of said chassis.

9. The chassis of claim 8, wherein said plurality of positions conform with different directions and speeds of travel.

10. The chassis of claim 1, wherein said control system comprises a microcomputer controller operatively connected to each of said first and second pivoting means and to each of said first and second drive means.

11. The chassis of claim 10, wherein said control system further comprises an operator-interface.

12. The chassis of claim 11, wherein said operator-interface comprises a keypad.

13. The chassis of claim 1, wherein said angular displacement is measured from a 0° location in which each of said drivewheels is directed in a forward direction.

14. The chassis of claim 1, wherein said frame is substantially rectangular.

15. The chassis of claim 1, wherein said pivoting means comprises a drive gear operatively connected to said kingpin.

16. The chassis of claim 15, wherein said pivoting means further comprises a drive rack having two ends, one of said ends engaging said drive gear and the other of said ends engaging an actuating means for driving said drive rack.

17. The chassis of claim 16, wherein said actuating means comprises a DC motor.

18. The chassis of claim 15, wherein said drive gear engages a stepper gear operatively connected to a stepper motor.

19. A wheeled chassis having independently pivotable drivewheels for omnidirectional motion, comprising:

a frame;

first and second drivewheels, each said drivewheel being connected by a kingpin to said frame;

at least one free-spinning wheel rotatably attached to said frame;

first and second pivoting means for independent and unrestricted 360° pivoting of each respective kingpin of each respective drivewheel about a substantially vertical axis, said first and second pivoting means cooperatively determining a direction of travel of said chassis;

first and second drive means each operatively connected to a respective drivewheel for moving the chassis in said determined direction of travel;

a control system operatively connected to said pivoting means and said drive means for controlling and changing said direction of travel and for setting a speed of travel of said chassis; and means for sensing an angular displacement of each of said drivewheels with respect to its respective vertical axis;

wherein said sensing means comprises, for each of said drivewheels, a light source and a phototransistor operatively illuminated by said light source when the drivewheel is in a zero position.

20. A wheeled chassis in accordance with claim 19, said control means comprising means operable by a user of the chassis for selective user control of the independent operation of each of said first and second pivoting means.

21. A wheeled chassis in accordance with claim 19, said control means comprising means operable by a user of the chassis for selective user control of the independent operation of each of said first pivoting means, said second pivoting means, said first drive means and said second drive means.

22. A wheeled chassis in accordance with claim 20, wherein said user operable means comprises a joystick controller.

23. A wheeled chassis in accordance with claim 21, wherein said user operable means comprises a joystick controller.

24. A wheeled chassis in accordance with claim 19, wherein said sensing means is connected to said control means for monitoring said pivotal rotation of each said drivewheel relative to said frame about said respective vertical axis.

25. A wheeled chassis in accordance with claim 19, further comprising a seat on said frame for accommodating a user of said chassis as a wheelchair.

26. A wheeled chassis having independently pivotable drivewheels for omnidirectional motion, comprising:

a frame;

first and second drivewheels, each said drivewheel being connected by a kingpin to said frame;

at least one free-spinning wheel rotatably attached to said frame;

first and second pivoting means for independent and unrestricted 360° pivoting of each respective kingpin of each respective drivewheel about a substantially vertical axis, said first and second pivoting means cooperatively determining a direction of travel of said chassis;

first and second drive means each operatively connected to a respective drivewheel for moving the chassis in said determined direction of travel;

a control system operatively connected to said pivoting means and said drive means for controlling and changing said direction of travel and for setting a speed of travel of said chassis; and means for sensing an angular displacement of each of said drivewheels with respect to its respective vertical axis;

wherein said sensing means comprises a photodetection device and a counting system.

27. A wheeled chassis in accordance with claim 26, said control means comprising means operable by a user of the chassis for selective user control of the independent operation of each of said first and second pivoting means.

28. A wheeled chassis in accordance with claim 26, said control means comprising means operable by a user of the chassis for selective user control of the independent operation of each of said first pivoting means, said second pivoting means, said first drive means and said second drive means.

29. A wheeled chassis in accordance with claim 27, wherein said user operable means comprises a joystick controller.

30. A wheeled chassis in accordance with claim 28, wherein said user operable means comprises a joystick controller.

31. A wheeled chassis in accordance with claim 26, wherein said sensing means is connected to said control means for monitoring said pivotal rotation of each said drivewheel relative to said frame about said respective vertical axis.

32. A wheeled chassis in accordance with claim 26, further comprising a seat on said frame for accommodating a user of said chassis as a wheelchair.

* * * * *